May 22, 1951 G. L. ST. MARIE 2,553,729

SAFETY DEVICE FOR TELEVISION OR RADIO RECEIVING SETS

Filed Oct. 30, 1946

INVENTOR.
Gerald L. St. Marie

BY Victor J. Evans & Co.

ATTORNEYS

Patented May 22, 1951

2,553,729

UNITED STATES PATENT OFFICE 2,553,729

SAFETY DEVICE FOR TELEVISION OR RADIO RECEIVING SETS

Gerald L. St. Marie, Indian Orchard, Mass.

Application October 30, 1946, Serial No. 706,568

1 Claim. (Cl. 177—311)

This invention relates to radio and television apparatus, and more particularly to the provision of means for indicating when the power is on in such apparatus.

In radio and television apparatus, when not in use, the power is often turned on by children and others with no broadcasting program on. Continued application of power to cathode tubes and radio tubes results in their deterioration and destruction.

It is, therefore, an object of this invention to provide a device for producing an audible or visual signal, when the power has been turned on or allowed to remain on a receiving set with no incoming broadcasting signals.

A further object is the provision of an indicating device for radio and television apparatus which can be attached as a separate unit without interfering with the general operation of the apparatus.

These and other objects are attained by the novel construction and arrangement of parts hereinafter described and illustrated by the accompanying drawings, forming a part hereof, and in which.

Figures 1, 2, 3:
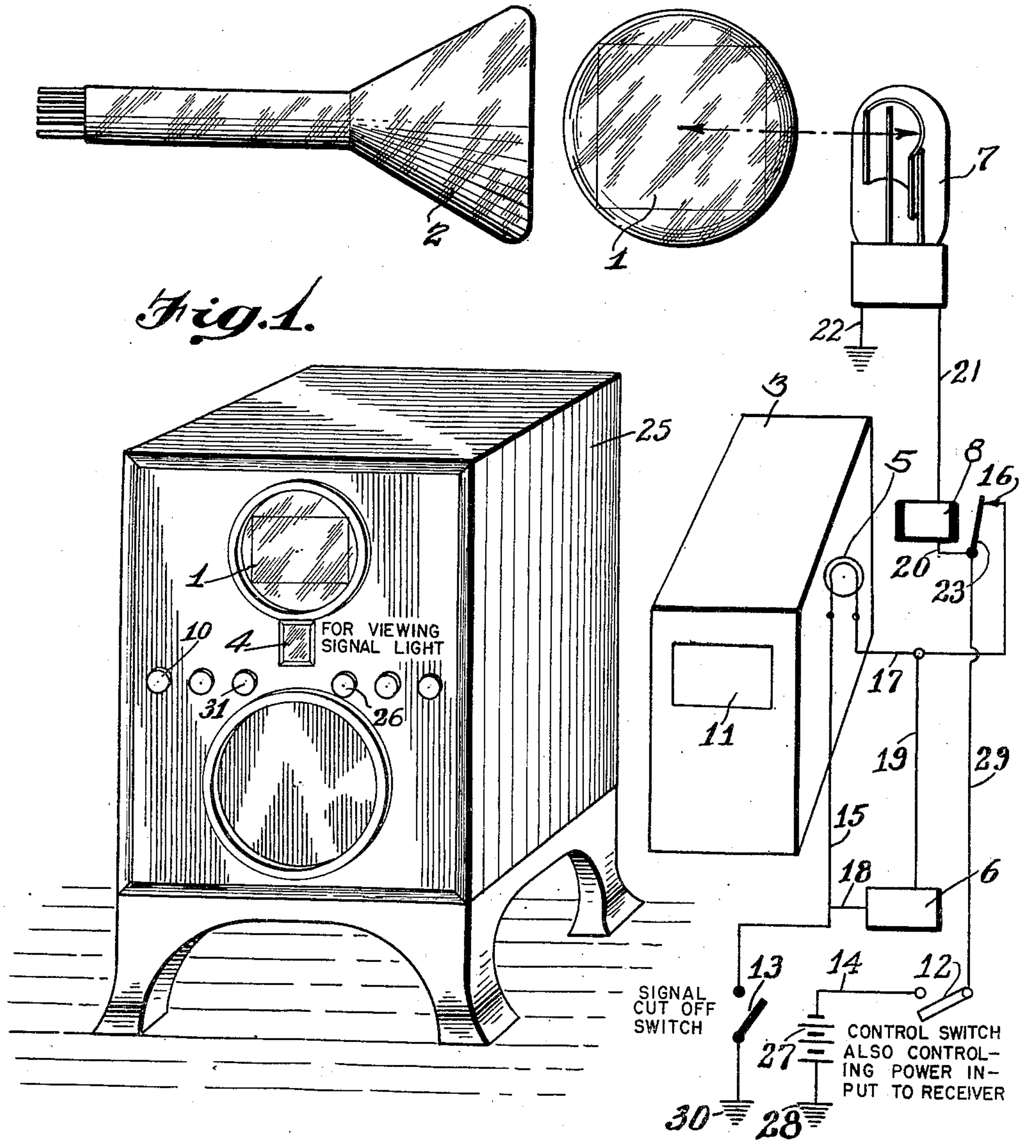
Figure 1 is a perspective view of a television apparatus to which the device can be applied.
Figure 2 is a schematic sketch of the arrangement of the signalling apparatus.
Figure 3 is a side view of a cathode ray tube used in a television apparatus.

Referring now to the drawings wherein like reference characters denote corresponding parts the signal device of this invention includes a signal light 5, a buzzer 6, a photo-electric cell 7 and a relay 8 and these parts are provided in a small case 3 that is positioned behind a window 4 of a television receiver cabinet 25 which is also provided with a screen 1 behind which a cathode ray tube 2 is positioned, and the cabinet is provided with suitable control knobs 10.

The signal device of this invention may be incorporated in a television receiver and made an integral part thereof or it may be provided as a separate and independent unit.

The receiver cabinet is provided with a controlling input power circuit knob 26 which actuates the power input contact of the receiver and also control switch 12 in the signal circuit.

The switch 12 is connected by a wire 14 to a battery 27, the opposite terminal of the battery being connected to a ground 28. The opposite terminal of the switch 12 is connected by a wire 29 to a contact arm 23 of the relay 8 and the arm is connected to one terminal of the relay by a wire 20. The opposite terminal of the relay is connected by a wire 21 to one side of the photoelectric cell 7 and the opposite side of the photoelectric cell is connected to a ground through a wire 22.

The contact arm 23 of the relay is positioned to engage a contact point 16 which is connected to the signal light 5 through the wire 17. The opposite terminal of the signal light is connected by a wire 15 to a ground 30 through the signal cut-off switch 13. The buzzer 6 is also connected in the circuit with one terminal thereof connected to the wire 17 by a wire 19 and the other terminal connected to the wire 15 by a wire 18. The switch 13 is actuated by a knob 31 on the face of the cabinet. When the control switch 26 of the apparatus is turned on, the safety light 5 and the buzzer 6 are turned on. The safety light 5 remains on except when a program is tuned in and when the brilliance of the image screen 1 is increased, at which time the increased brilliance reacts on the photo cell to cut off the safety light and buzzer for the duration of the program, and in this way will not impair or detract from the image.

As the circuit is turned on by the knobs 26 and 31 current will be supplied to the light 5 and buzzer 6 through the signal circuit and when the television program is tuned in, the brilliance of the tube 2 influences the photo-electric cell 7 so that through the relay circuit the solenoid of the relay 8 is energized, and as this draws the switch arm 23 away from the contact 16 the circuit will be broken so that the light will go off and the buzzer will stop. As soon as the cathode ray tube is turned off the arm 23 drops away from the solenoid and again completes the circuit through the light and buzzer so that the warning signal will again be given should the receiver be turned on again.

When the brilliance of the image screen is reduced or the program is off, the warning light will immediately indicate that the power is on and should be turned off. When the power is turned off by the control switch, the signal light 5 also goes off, and the buzzer is automatically returned to a position so that when the control switch is again turned on the buzzer will again go on until cut off by relay 8 which is controlled by the photo cell 7.

The photo cell 7 can be put in various positions around the image screen 1 as may be desired.

The basic principle of the device as described above is also applicable to radio receiving sets.

The device is simple and obviously can be readily applied to any type of television or radio apparatus.

The above description is to be considered as illustrative and not limitative of the invention of which modifications can be made without departing from the spirit and scope as denoted by the appended claim.

The invention having been described, what is claimed is:

In a television receiver, the combination which comprises a cabinet, a cathode ray tube positioned in the cabinet, a photo-electric cell mounted in the cabinet and positioned to be influenced by the brilliance of the cathode ray tube, a signal light positioned in the cabinet, said cabinet having a window positioned for viewing the said signal light, a buzzer positioned in the cabinet, a relay also positioned in the cabinet, a relay circuit connecting the photo-electric cell to the relay, a signal circuit connecting the signal light and buzzer to the relay whereby upon closing the circuit to the relay by the photo-electric cell the signal circuit is opened, a power input control switch mounted on the cabinet and also connected through the relay and signal circuit whereby the relay and signal circuits and power input control switch of the receiver are actuated by a common switch, and a signal cut-out switch also positioned in the cabinet and connected to the relay and signal circuit whereby with the cut-out switch closed the signal light and buzzer circuits are closed and the power input control switch is closed and whereby brilliance of the cathode ray tube actuates the relay to open the circuit of the signal light and buzzer.

GERALD L. ST. MARIE.

REFERENCES CITED

The following references are of record in the file of this patent:

UNITED STATES PATENTS

| Number | Name | Date |
|---|---|---|
| 1,266,678 | Gromann | May 21, 1918 |
| 1,450,549 | Howard | Apr. 3, 1923 |
| 1,529,433 | Hopkins | Mar. 10, 1925 |
| 2,337,535 | Acs | Dec. 28, 1943 |
| 2,369,783 | Homrigholis | Feb. 20, 1945 |